US006673244B1

(12) United States Patent
Maekawa et al.

(10) Patent No.: US 6,673,244 B1
(45) Date of Patent: Jan. 6, 2004

(54) MAGNETIC SLUDGE SUITABLE FOR USE IN WASTEWATER TREATMENT, METHOD FOR PREPARING THE SAME AND METHOD FOR WASTEWATER TREATMENT

(75) Inventors: Takaaki Maekawa, Ibaraki (JP); Mitsuaki Kuroshima, Ibaraki (JP)

(73) Assignee: Japan Science and Technology Corporation, Saitama (JP)

( * ) Notice: Subject to any disclaimer, the term of this patent is extended or adjusted under 35 U.S.C. 154(b) by 0 days.

(21) Appl. No.: 09/913,737
(22) PCT Filed: Feb. 18, 2000
(86) PCT No.: PCT/JP00/00932
§ 371 (c)(1),
(2), (4) Date: Oct. 31, 2001
(87) PCT Pub. No.: WO00/48948
PCT Pub. Date: Aug. 24, 2000

(30) Foreign Application Priority Data

Feb. 19, 1999 (JP) .............................. 11/041968
Feb. 19, 1999 (JP) .............................. 11/041969

(51) Int. Cl.$^7$ ................................................ C02F 3/28
(52) U.S. Cl. .................. 210/603; 210/616; 210/903; 210/695; 210/150; 435/178; 435/180; 252/62.54
(58) Field of Search ............................... 210/615, 616, 210/617, 150, 151, 603, 903, 695; 435/177, 178, 180, 182; 252/62.54

(56) References Cited

U.S. PATENT DOCUMENTS

| 2,188,162 | A | * | 1/1940 | Schulthoff | .................. 210/615 |
| 4,088,571 | A | * | 5/1978 | Helgesson | .................. 210/150 |
| 4,144,373 | A | * | 3/1979 | Weiss et al. | ............. 210/502.1 |
| 4,200,524 | A | * | 4/1980 | Levin | ......................... 210/616 |
| 5,000,853 | A | * | 3/1991 | Reischl et al. | ............. 210/616 |
| 5,085,766 | A | * | 2/1992 | Born | ......................... 210/150 |
| 5,447,633 | A | * | 9/1995 | Matsche et al. | ............ 210/903 |
| 6,043,068 | A | * | 3/2000 | Maekawa et al. | ........... 435/182 |
| 6,159,371 | A | * | 12/2000 | Dufay | ......................... 210/150 |
| 6,204,033 | B1 | * | 3/2001 | Müller-Schulte | ............ 435/180 |
| 6,290,851 | B1 | * | 9/2001 | Maekawa et al. | ........... 210/616 |
| 6,297,033 | B1 | * | 10/2001 | Van Rijn et al. | ............ 435/178 |

FOREIGN PATENT DOCUMENTS

| JP | 2-122893 | 5/1990 |
| JP | 3-254895 | 11/1991 |
| JP | 8-257589 | 10/1996 |
| JP | 10-216762 | 8/1998 |
| JP | 11-18765 | 1/1999 |

* cited by examiner

Primary Examiner—Christopher Upton
(74) Attorney, Agent, or Firm—Wenderoth, Lind & Ponack, L.L.P.

(57) ABSTRACT

A magnetic sludge which is suitable for use in waste water treatment, is easy to prepare, contains microbes and interacts with a magnetic field; and a method for treating waste water with improved efficiency comprising employing a biological membrane which uses the magnetic sludge and hence is easy to control its movement.

7 Claims, 14 Drawing Sheets

WATER PASSAGE →

(A)　　　　　　　　(B)

MAGNETIC SLUDGE SUITABLE FOR USE IN WASTEWATER TREATMENT, METHOD FOR PREPARING THE SAME AND METHOD FOR WASTEWATER TREATMENT

This application is a 371 application of PCT/JP00/00932 filed Feb. 18, 2000.

TECHNICAL FIELD

The invention of the present application concerns a magnetic sludge suitable for use in wastewater treatment, a method for preparing the same and a method for wastewater treatment by using the same.

Further, the invention of the present application concerns a novel method for wastewater treatment using inclusive fixed carrier which enables wastewater treatment at high efficiency by a facility at a reduced cost and which is also excellent in preventing clogging or channeling in a treatment tank, as well as an apparatus therefor.

BACKGROUND ART

As one of wastewater treatment techniques, an upflow/downflow anaerobic fixed bed reactor has been known.

However, this technique involves a drawback that suspended matters or grown microorganisms in wastewater clog the fixed bed to bring about pressure loss in passing water or bring about a channeling phenomenon in passing wastewater. Further, when a microorganism carrier is used for the fixed bed, the carrier floats on the water surface by buoyancy of gases generated from the carrier itself to give undesired effects on the treatment efficiency and the design of the apparatus. On the other hand, an upflow sludge blanket reactor has been considered to be an apparatus capable of solving the foregoing problems. However, this apparatus actually necessitates a gas-sludge separation device and involves a problem of complexity in view of the apparatus design such that a correct design is indispensable for a homogeneous dispersion inflow system at the bottom of a reactor. Further, it has a serious problem of requiring long set up period for the treatment operation such that it takes 3 to 4 months for forming granule sludges formed in the apparatus. Furthermore, formation of granule sludges utilizes deposition and agglomeration effect of microorganisms, and it has been reported that it does not function well in wastewater containing proteins or lipids.

In order to overcome such problems, while it has been considered effective to prepare sludges containing great amount of microorganisms in a short period of time and utilize them as biological membranes, as well as to control the movement of the biological membranes, such technical means has not yet been provided actually so far.

Further, an apparatus for wastewater treatment incorporating a fixed carrier for supporting and fixing microorganisms in a treatment tank and a method for wastewater treatment using the same have been known so far.

However, the method and the apparatus using existent fixed carriers involve problems, for example, that gases generated in the treatment tank are deposited to the carriers thereby tending to rise the carrier, it is difficult to suppress occurrence of channeling referred to as water channel in the carrier filled region and further substrate and oxygen do not permeate and diffuse rapidly into the carriers.

While studies have been progressed in view of the shape and the structure of the carrier in order to improve the situations described above, they have not always provided sufficient effect at the present situation. For example, this can be seen also in a case of a microorganism deposition type cord carrier in which microorganisms are deposited and fixed to a string-like support. For the submerged filter bed method using the microorganism deposition type cord carrier, the following problems are pointed out.

That is, at first, it takes a long time for the wastewater treatment operation to reach a stationary state. This is because it takes a long time for microorganism communities that are spontaneously formed in the treatment tank (activated sludge, anaerobic sludge) and effective to wastewater treatment to deposit on the surface of the cords and grow to a sufficient amount required for the treatment.

Secondly, when solids are contained in the wastewater, the treatment efficiency is remarkably lowered. This is because the microorganism communities deposited and grown on the cord are exposed directly to wastewater and, accordingly, the microorganism communities are formed upon inflow or stirring of wastewater by kinetic energy of solids. Under such a circumstance, the concentration of outflowing solids increases more in the treated water than that before treatment to worsen the water quality.

Thirdly, it requires considerable experience and knowledge for maintenance. When microorganism deposition type cords are utilized, sludges are sometimes deposited excessively on the cords to cause channeling in the treatment tank. For preventing this, excess sludges have to be removed by backwashing relying on operators' knowledge and intuition. This also requires back washing pipelines and facilities which lead to an increased cost.

Fourthly, it is sensitive to bulking. Particularly, when filamentous bacteria appear in the aerobic wastewater treatment, they become dominant species to expel other useful microorganisms, which is referred to as bulking to reduce the treatment efficiency. Since the useful microorganisms on the deposition type cords are exposed directly to wastewater, they directly undergo the effects of the filamentous bacteria and die. If such a state should occur, it is necessary to take out the deposition type cords entirely from the treatment tank and completely wash them.

Since the problems as described above are substantially in common with carriers of other shapes and structures, it has been demanded for a drastical improvement capable of dissolving the existent problems as described above such as floating of the carrier by the generated gases, occurrence of channeling and slow penetration and diffusion of the substrate and oxygen into the carrier, and the problem as in the case of the cord carrier.

DISCLOSURE OF THE INVENTION

For solving the foregoing subjects the invention of the present application provides at first a magnetic sludge characterized by containing microorganisms and having reactivity to magnetic field.

Further, the invention of the present application provides, secondly, a magnetic sludge in which paramagnetic material is contained and, thirdly, a magnetic sludge using a polymer as a support and, fourthly, a magnetic sludge in which the polymer comprises an insolubilized chitosan or polyvinyl alcohol.

Then, the invention of the present application provides, fifthly, a method for preparing a magnetic sludge containing microorganisms and having magnetic field reactivity in which paramagnetic material and a concentrated sludge are caught and supported on a polymer as a support and, sixthly, a preparation method in which a polymer comprises an insolubilized chitosan or polyvinyl alcohol.

Further, the invention of the present application, provides, seventhly, a method for wastewater treatment using the magnetic sludge according to any one of the first to fourth inventions in which the movement of the magnetic sludge is controlled by a magnetic force, eighthly, a method for wastewater treatment in which denitrification and methane fermentation are conducted simultaneously in one tank and, ninthly, a method for wastewater treatment for retaining the magnetic sludge to porous concretes.

Further, the invention of the present application provides, tenthly, a method for wastewater treatment by a treatment tank in which an inclusive fixed carrier possessing microorganisms and having magnetic property is filled in a submerged fixed filter bed in which the wastewater treatment is conducted by controlling the position of the magnetic inclusive fixed carrier in water by the change of the direction of the magnetic field by an external magnetic field.

Regarding the method described above, the invention of the present application provides, eleventhly, a method for wastewater treatment in which the inclusive fixed carrier is constituted as a beads-like, plate-like, cord-like or agglomerated sludge-like form.

Twelfthly, it provides a method for wastewater treatment in which the magnetic control is conducted by a permanent magnet or a solenoid coil.

Then, the invention of the present application provides, thirteenthly, a method for wastewater treatment of incorporating an inclusive fixed carrier possessing microorganisms and having magnetic property in a submerged fixed filter bed, in which a magnetic force application device is disposed for controlling the position of the inclusive fixed carrier in water by the change of the direction of the magnetic field and, fourteenthly, an apparatus for wastewater treatment in which the inclusive fixed carrier is constituted as a beads-like, plate-like, cord-like or agglomerated sludge-like form, fifteenthly, an apparatus for wastewater treatment in which the magnetic force application means comprises a permanent magnet or solenoid coil and, sixteenthly, an apparatus for wastewater treatment in which the magnetic force application device provides a fixed or variable magnetic field.

BEST MODE FOR PRACTICING THE INVENTION

The invention of the present application has the features as described above and the mode of practicing them is to be explained below.

At first, for the magnetic sludge according to the invention of the present application, an appropriate support is used on which a concentrated sludge is supported and microorganisms are possessed, and the sludge has a sensitive reactivity (responsivity) to the magnetic field as the magnetic sludge.

Referring more specifically for the example of such magnetic sludge, a paramagnetic material and a concentrated sludge may be suspended in a solution of acetic acid-chitosan and fixed by the crosslinking reaction of chitosan. Chitosan has an effect of dissolving in an acetic acid solution and coagulating to settle suspended matters if they are present in the solution. When an alkali solution such as of sodium hydroxide is added to the same, chitosan is insolubilized to form a sludge that firmly catches the paramagnetic material and the concentrated sludge. About several minuets of time are sufficient to the reaction requited for insolubilization and there is little undesired effect on the microorganisms. When the thus formed sludge is thoroughly washed with water and recovered by using a permanent magnet, a magnetic sludge is obtained.

The paramagnetic material referred to herein is a special magnetic material found in ferroelectric material which has no remanence magnetization when put under a magnetic field and does not deposit to each other even after taking out of the magnetic field as observed in usual magnetic material. This property is preferred for the wastewater treatment and a fine powder of iron oxide such as magnetite or ferrite can be mentioned as the material.

The magnetic sludge is in the state of catching microorganisms on the inside upon starting of the wastewater treatment. Since the surface of the insolubilized chitosan is rough and porous, microorganisms are adsorbed and grown thereon.

Accordingly, biological membranes are formed also on the surface of the sludge as the treatment proceeds.

The support is not restricted to the chitosan polymer described above. It may be any material so long as it gives no or less undesired effect on the microorganisms for wastewater treatment. For example, polyvinyl alcohol may also be used. It is more appropriate that the surface of the polymers is porous.

There may be considered various kinds of methods of utilizing the magnetic sludge described above to the wastewater treatment. For example, the following two methods can be exemplified. It will be apparent that the method of use is not restricted to them.

Figure 2:
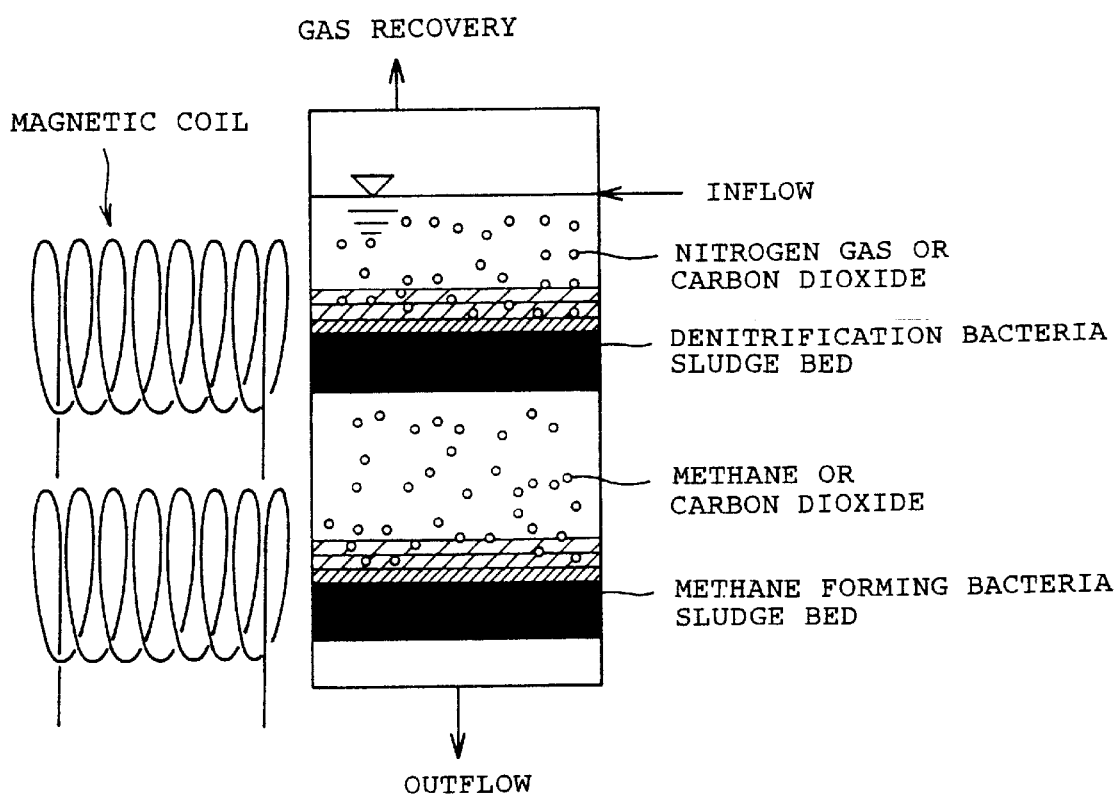
FIG. 2 shows a vertical cross sectional view illustrating Example 3, illustrating that microorganisms having different decomposing performance are cultured simultaneously in one tank.
Figure 3:
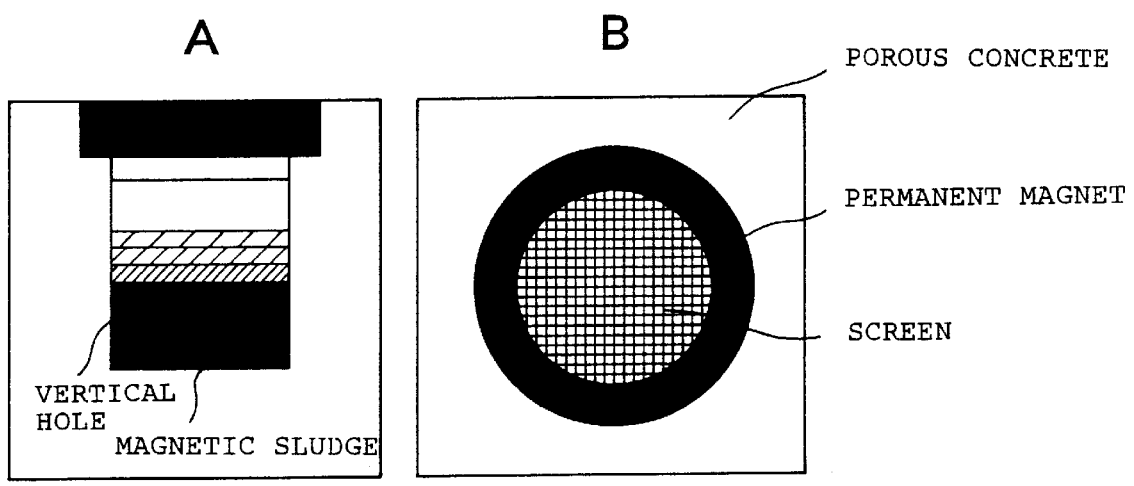
FIGS. 3(A) ,(B) shows a vertical cross sectional view and a plan view of Example 4, which illustrate application use to rivers.
Figure 4:
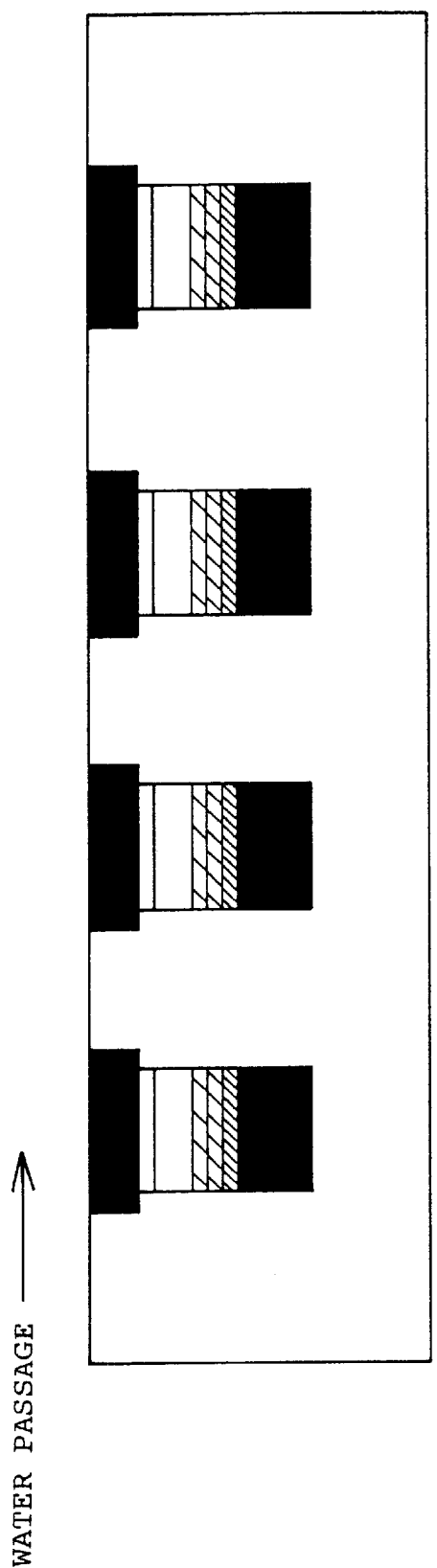
FIG. 4 shows a vertical cross sectional view like that FIG. 3.
Figure 5:
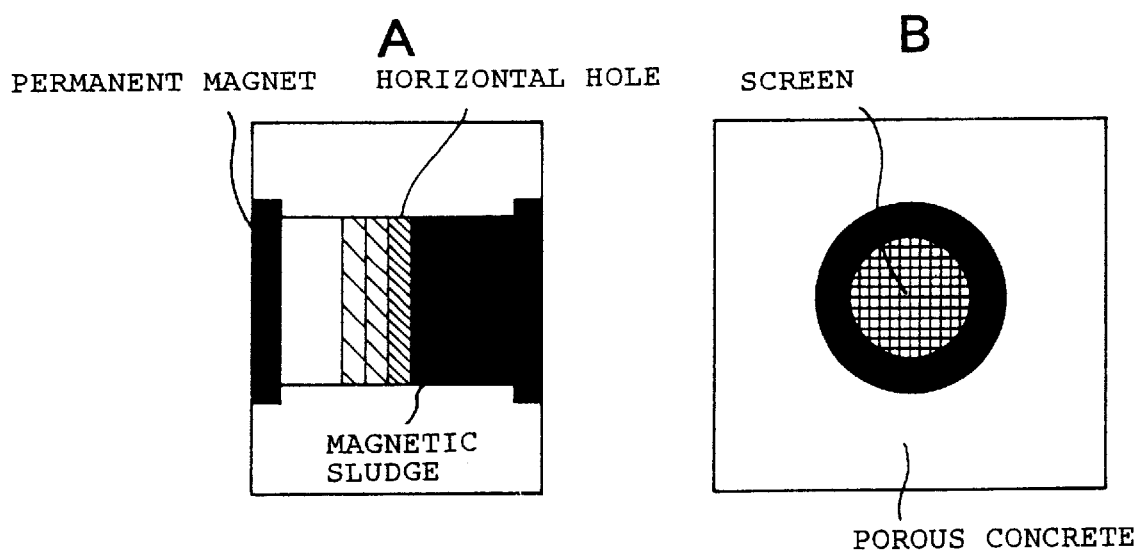
FIGS. 5(A), (B) shows a vertical cross sectional view and a side elevational view of Example 5, which illustrate application use to rivers.

The first example, as also used in Example 2 to be described later, is utilized as an upflow anaerobic sludge bed reactor in which a sludge head is formed with a magnetic sludge shown in FIG. 1. In the sludge bed, a great amount of microorganisms is possessed in the inside and on the surface of the magnetic sludge to decompose organic matters and nitrate nitrogen to form gases. The sludge bed vibrates the slightly undergoing a magnetic field from the outside by a magnetic coil or the like, which promotes the release of the generated gas and can also prevent clogging or channeling. The second example is a downflow anaerobic sludge bed reactor as shown in FIG. 2. Two types of sludge beds of decomposing different ingredients are formed by utilizing the magnetic fields from the outside of the apparatus. Nitrate nitrogen is consumed in an upper region and organic ingredients are consumed in a lower region. This can complete the treatment in one tank, which was separately conducted so far in two tanks due to the difference of decomposing ingredients by microorganisms. Furthermore, in this invention, an example of using the magnetic sludge applied to the treatment for river water can be shown. As illustrated in the vertical cross sectional view and the plan view of FIGS. 3(A), (B), porous concretes are perforated in which a permanent magnet is disposed to retain a magnetic sludge. It is adapted such that river water is passed on a screen at the upper surface of the hole. This constitution may also be modified as shown in FIG. 4. Alternatively, in the application use to rivers, it may be constituted as shown in FIGS. 5(A), (B) (vertical cross sectional view and side elevational view) and FIG. 6.

Of course, further various modes can also be adopted.

Further, this wastewater treatment has an essential feature of using a magnetic inclusive fixed carrier and fixing of the carrier to a position in water or the operation of changing the same is conducted by the magnetic force.

The wastewater treatment technique utilizing the magnetic field has been studied also in the prior art in the field of physical treatment but microorganism treatment has scarcely been studied. On the other hand, according to the method and the apparatus of this invention as described above, since the operation is given from the outside of the treatment tank to the carrier by the magnetic force as the change in the direction of the magnetic field, the following function and effect can be obtained.

<1> Floatation of the carrier is suppressed by removing generated gases deposited to the carrier.
<2> A channeling phenomenon is eliminated by preventing water channel occurring in the carrier phase (channeling).
<3> Turbulence is formed in the liquid of the treatment tank to promote penetration and diffusion of substrates or oxygen into the carrier.

The magnetic microorganism inclusive fixed carrier as described above in this invention may be in various kinds of shapes or structures such as magnetic beads, magnetic sludges of agglomerated sludge-like concentrated sludges and string-like magnetic cords. While the carriers are in the state of possessing concentrated microorganism communities at the start of the wastewater treatment, the microorganisms are grown also on the surface of the carrier during proceeding of the treatment and the biological membranes are formed also on the surface of the carrier when reaching the stationary treatment state.

The magnetic inclusive fixed carrier itself may be applied with a magnetic property by using a support for the shape and the structure described above. The support may, for example, be a natural or synthesis high molecular polymer. Specifically, they can include, for example, insolubilized chitosan, polyvinyl alcohol, polyester, polyether, polyacrylic material and insolubilized alginic acid.

For the support, those having porosity, particularly, surface porosity are used preferably.

The magnetic property may be provided by various kinds of means and, for example, a paramagnetic material can be used.

The paramagnetic material referred to herein is a special magnetic material found in ferroelectric material which has no remanence magnetization when put under a magnetic field and does not deposit to each other even after taking out of the magnetic field as observed in usual magnetic material. This property is preferred for the wastewater treatment and a fine powder of iron oxide such as magnetite or ferrite can be mentioned as the material.

They may be carried on the support.

As the inclusive fixed carrier having the magnetic property, a string-like magnetic cord is provided characteristically in this invention.

The magnetic cord can include, for example, more specifically, those formed by suspending a paramagnetic material and a concentrated sludge in a solution of alginic acid-polyvinyl alcohol (PVA) and fixing them by utilizing the crosslinking reaction of molecules in the mixed solution. Alginic acid ions in the solution of alginic acid-polyvinyl alcohol (PVA) are combined with calcium ions to form a polymer and are in solubilized. By utilizing this nature, the paramagnetic material and the concentrated sludge are included and fixed to the cord-like support. After strength has been obtained to some extent on the surface of the cord, the fixed cord is thoroughly washed with water and frozen at a low temperature of about −20° C. The PVA molecules in the solution of alginic acid-polyvinyl alcohol (PVA) has a nature of releasing molecules of water from the polymeric structure upon repeating freezing and thawing to make the structure firm. By utilizing this nature, the physical strength of the magnetic cord is increased by repeating freezing and thawing thereof for about three times.

Calcium alginate and polyvinyl alcohol polymer obtained by the operation form a porous gel in a shape suitable to growing of microorganisms and release of generated gases, and have an advantageous nature for the wastewater treatment. Presence of the paramagnetic material in the gel molecule provides a moderate slackening in the gel lattice structure, which promotes penetration and diffusion of contaminant ingredients in wastewater into the gel to make the growing of microorganisms vigorous.

While the magnetic cord is in the state of possessing concentrated microorganism communities in the inside of the carrier at the start of the wastewater treatment, the microorganisms are adsorbed and grown also on the porous surface of the cords during progress of the treatment and the biological membranes are formed also on the surface of the cords when the treatment efficiency reaches a stationary state.

The device for controlling the movement of the magnetic fixed carrier from the outside by the magnetic force may be a permanent magnet or a solenoid coil. The permanent magnet is one of device that can be adopted more conveniently. As a matter of fact, the permanent magnet may be various kinds of magnets such as Alnico magnet, ferrite magnet or rare earth magnet. Further, depending on the case, it may be a super conductive magnet.

The magnetic field exerting on the magnetic carrier can be changed by the device, for example, for moving or rotating the permanent magnet itself as the magnetic force application means. In the case of the electromagnet, it may be adapted such that the position of the magnetic field forming coil can be varied.

Then, examples are shown below and the mode of practicing this invention is to be explained more specifically. Of course, this invention is not restricted to such examples.

EXAMPLE

Example 1

Preparation Example
(Preparation of Magnetic Sludge for Wastewater Treatment Containing Paramagnetic Material)

Figure 7:
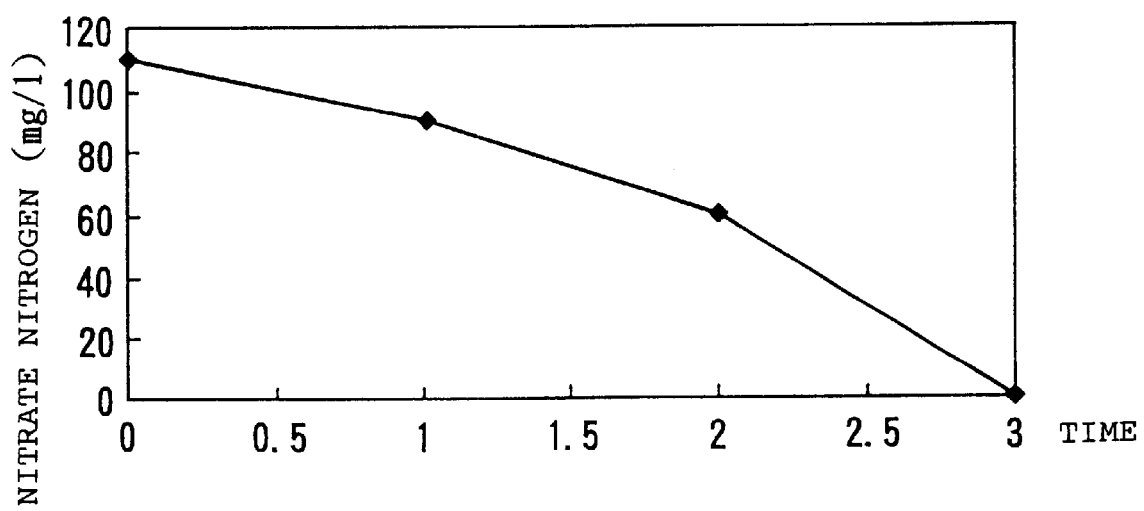
FIG. 7 shows a graph illustrating a denitrification effect by a magnetic sludge as Example 1.

200 to 300 mg of chitosan are dissolved in 50 to 100 ml of a diluted acetic acid solution. 1.5 to 3.0 g of magnetite and 15 to 30 g of concentrated sludge (about 3% solid concentration) are mixed and suspended in the solution. When magnetite and concentrated sludge are coagulated, 5 to 30 ml of a sodium hydroxide solution (1 N) is added and stirred vigorously. Chitosan is insolubilized for 2 to 3 min to catch magnetite and concentrated sludge. When they are washed with a great amount of water and centrifugated at 3000 rpm for 15 min, about 10 g of a magnetic sludge is obtained. As shown in FIG. 7, in a denitrification reaction experiment for semi-continuous culturation using the magnetic sludge, 100% of removal rate was attained at the third day of the culturation under the conditions at a nitrate nitrogen load of 1.8 mg/g, a magnetic sludge/day and for a hydraulic staying time of one day.

Example 2

Figure 1:
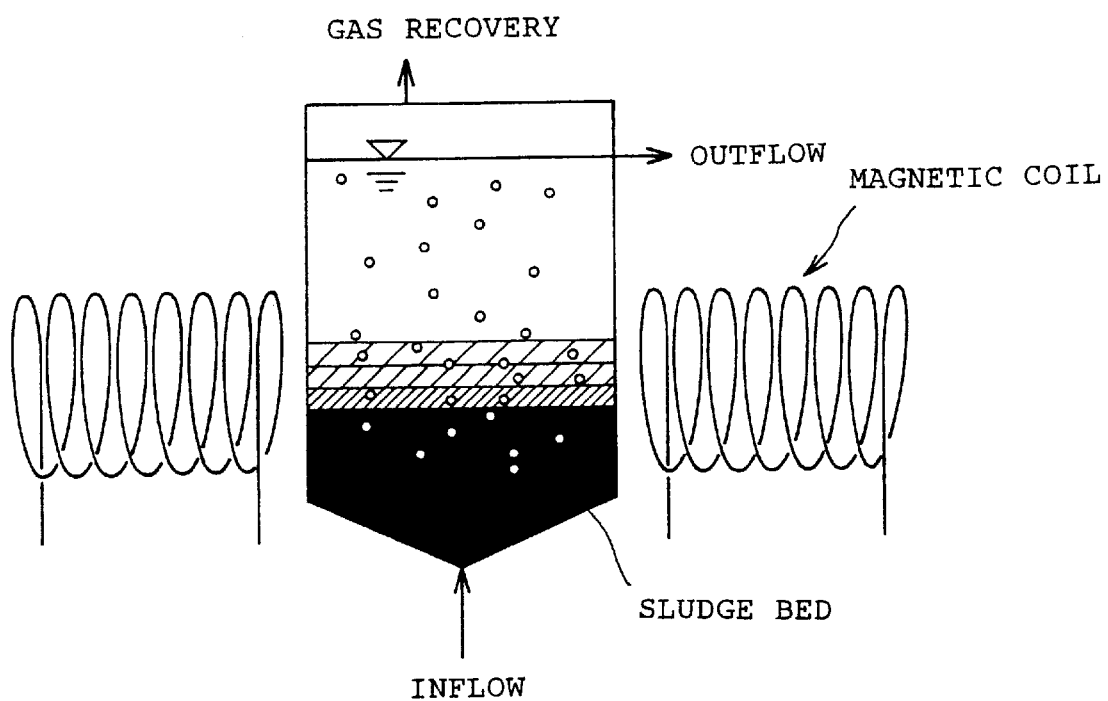
FIG. 1 shows a vertical cross sectional view illustrating Example 2.

An upflow anaerobic sludge bed reactor formed with a magnetic sludge bed is constituted as shown in FIG. 1. In the sludge bed, a great amount of microorganisms are possessed in the inside and on the surface of the magnetic sludge, which decompose organic matters and nitrate nitrogen to form gases. Since a greater amount of microorganisms are possessed in the magnetic sludge compared with usual treatment, the treatment efficiency is improved. A magnetic field is applied from the outside of the apparatus to the sludge bed by using, for example, magnetic coils. Magnetic coils are disposed in two or more directions and electric current is supplied to them while changing the time of application to change the direction of the magnetic field periodically. When the sludge bed is moved little by little by the operation, release of generated gases can be promoted and clogging or channeling can also be prevented.

Example 3

A downflow anaerobic sludge bed reactor is constituted as shown in FIG. 2. This is a downflow anaerobic sludge bed reactor with a magnetic field from the outside of the apparatus. Two types of sludge beds of different decomposition ingredients are formed by utilizing the magnetic fields from the outside of the apparatus. Nitrate nitrogen is consumed by denitrification bacteria in the upper denitrification bacteria sludge bed, while organic ingredients are consumed by methane forming bacteria in the lower methane forming bacteria sludge bed. In the upper region, the denitrification bacteria consume nitrate nitrogen by utilizing a carbon source contained in the wastewater, and excess carbon source not utilized in this step goes to the lower region. In this region, methane forming bacteria decompose the carbon source flowing from the upper region. While carbon dioxide and methane gas are generated in this step, they are directed upward and partially utilized as a carbon source for the denitrification bacteria. By the operation, the treatment conducted separately so far in two tanks is completed in one tank. The method of moving the magnetic sludge bed is identical with that in Example 2.

Example 4

A magnetic sludge is retained in a hole perforated in porous concretes and applied to purification of water of rivers and lakes. A doughnuts-like permanent magnet is buried to the lateral side of the entrance of the hole perforated in the concretes as shown in FIGS. 3(A), (B). The magnetic sludge does not escape out of the hole by the magnetic force. A screen is disposed at the entrance for preventing intrusion of miscellaneous matters. As shown in FIG. 4, concretes provided with a plurality of such holes are settled in rivers and lakes and contaminated water intruding into them is cleaned by the magnetic sludge. Microorganisms that escape from the magnetic sludge, and grown and suspended are deposited to the fine pores of the concrete and contribute to the improvement of the treatment efficiency.

Example 5

Figure 6:
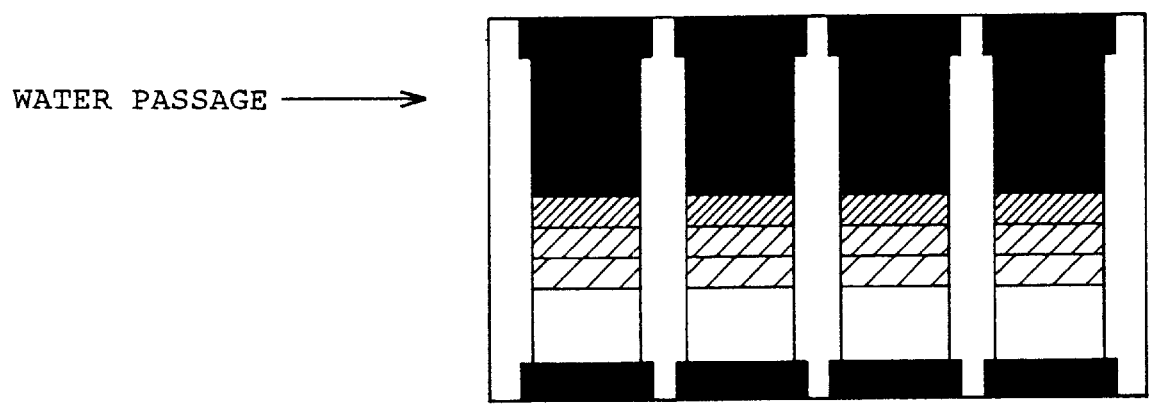
FIG. 6 shows a vertical cross sectional view like that FIG. 5.

A magnetic sludge is retained in a hole perforated in porous concretes and applied to the purification of water of rivers and lakes. Doughnuts-like permanent magnets are buried to the lateral surface of the inlet and outlet of the hole perforated in the concretes as shown in FIGS. 5(A), (B). The magnetic sludge does not escape outside of the hole by the magnetic force. Screens are disposed at the entrance and the exit for preventing intrusion of miscellaneous matters. The direction of disposing the concretes is made in parallel with the flow of water as shown in FIG. 6. This makes the contaminated water to be in contact with the magnetic sludge more positively.

As has been explained above specifically, the magnetic sludge according to this invention suitable for use in wastewater treatment can provide the following effects.

1. Application of a polymer such as chitosan can catch a great amount of concentrated sludge containing microorganisms and the paramagnetic material in a short period of time.
2. Microorganisms at high concentration can be reliably possessed in the apparatus by the retention of the magnetic sludge utilizing the magnetic field.
3. By the movement of the magnetic sludge as shown in FIG. 1, it is possible to promote the release of the generated gas and prevent clogging and channeling.
4. As shown in FIG. 2, microorganisms having different decomposing performance can be cultured simultaneously in one tank.
5. As shown in FIGS. 3 to 6, it is possible to improve the efficiency for the purification of water of rivers and lakes.

Example 6

Figure 8:
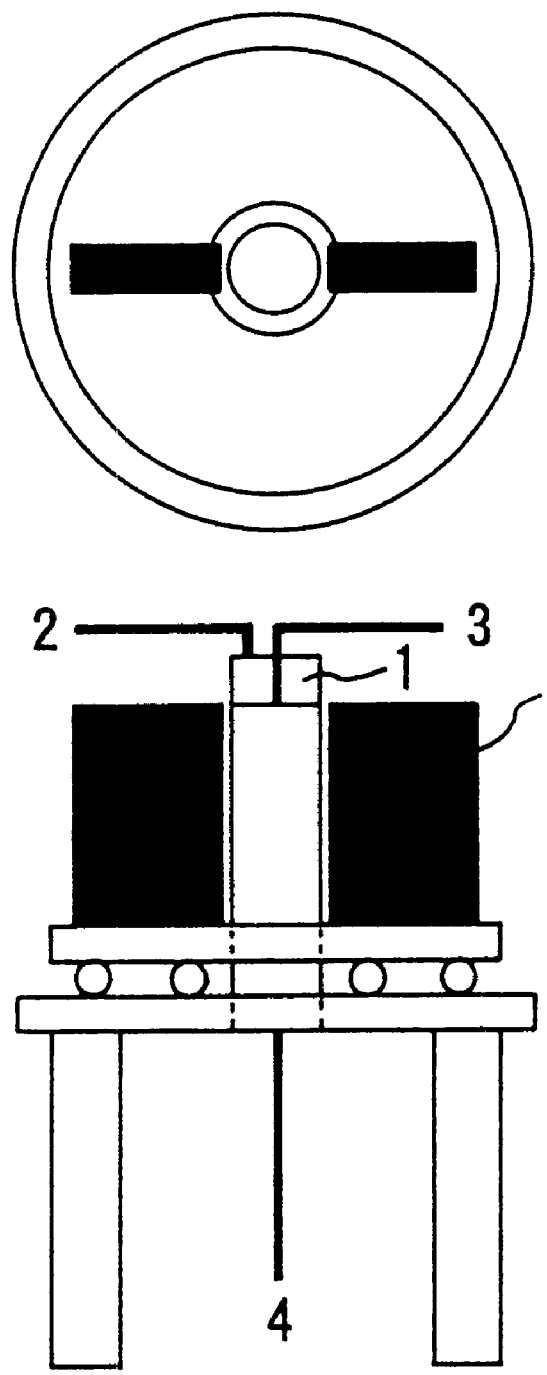
FIG. 8 shows a plan view and a cross sectional view illustrating a turn table type magnet utilizing wastewater treatment apparatus.

Appended FIG. 8 shows a plan view and a cross sectional view illustrating an example of a turn table type magnet utilizing wastewater treatment apparatus. 1 denotes a treatment tank and 2 denotes a line for guiding the generated gas to a gas retainer. When 3 or 4 is used as an inflow entrance or outflow exit, the treatment tank can be set as an upflow type or a downflow type. A turntable carrying a permanent magnet 5 is turned around the treatment tank to periodically change the direction of the magnetic field generated in the treatment tank. A microorganism inclusive fixed carrier having magnetic property is filled in the treatment tank and the carrier is moved by utilizing the change of the direction of the magnetic field. Further, the carrier is retained in the tank by utilizing the magnetic field in the treatment tank to prevent outflow and keep the bacterial concentration high in the tank. The intensity of the magnetic flux density in the treatment tank can be changed by changing the distance from the treatment tank to the magnet. Further, the state of moving the carrier can be changed by varying the rotating speed of the turntable.

Figure 9:
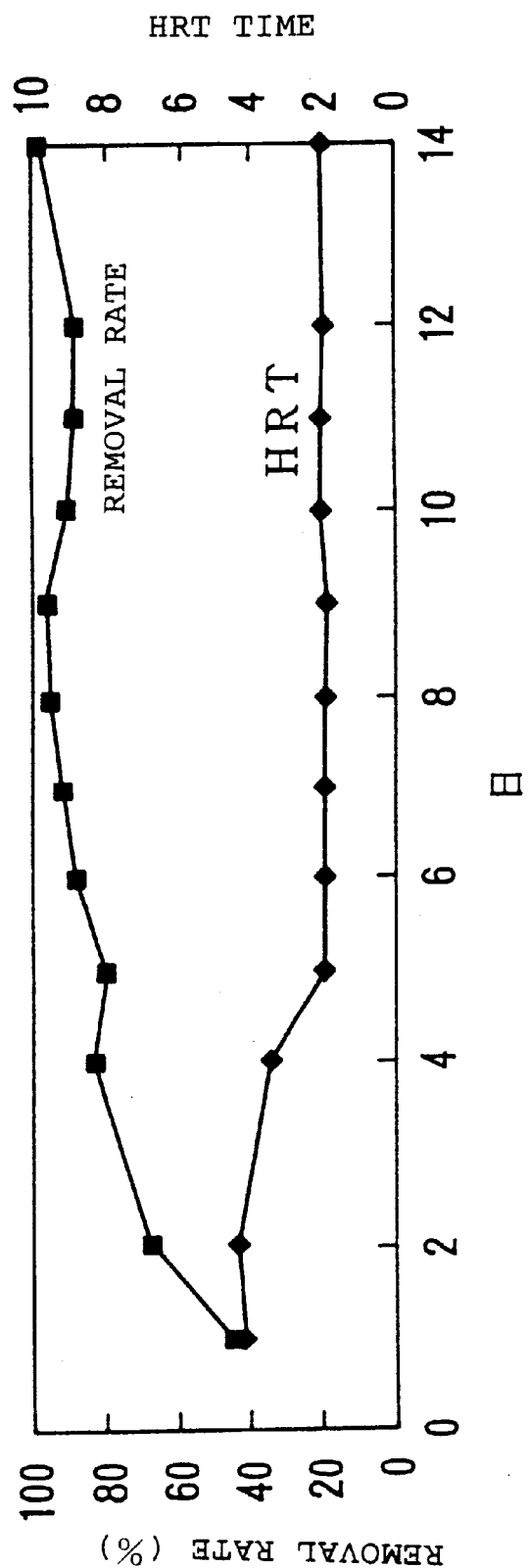
FIG. 9 shows a graph showing the example of a result for removing nitrate nitrogen by the apparatus shown in FIG. 8.

For example, denitrification treatment is conducted actually by using the turntable type magnet utilizing wastewater treatment apparatus shown in FIG. 8. About 20 to 25% for an effective volume (solid content 8.4% (w/w)) of a magnetic sludge (comprising insolubilized chitosan support and paramagnetic material) was incorporated in a treatment tank. The concentration of nitrate nitrogen in the inflowing liquid was set to 100 mg/l. While maintaining the distance from the end of the magnet to the treatment tank at 3 mm, the turn table was rotated at a speed of 1.67 turn/min for 15 min per 1 hour. The treatment was conducted by a continuous operation which was started with the average hydraulic mean staying time (HRT) of 4 hr and lowered to 2 hr. As shown in FIG. 9, a nitrogen removal rate of 90% or higher was attained after the sixth day of the operation.

Example 7

Figure 10:
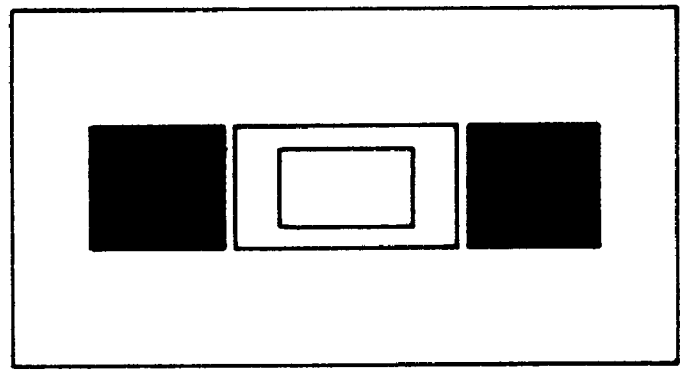
FIG. 10 shows a plan view and a cross sectional view illustrating a horizontal moving type magnet utilizing wastewater treatment apparatus.
Figure 10:
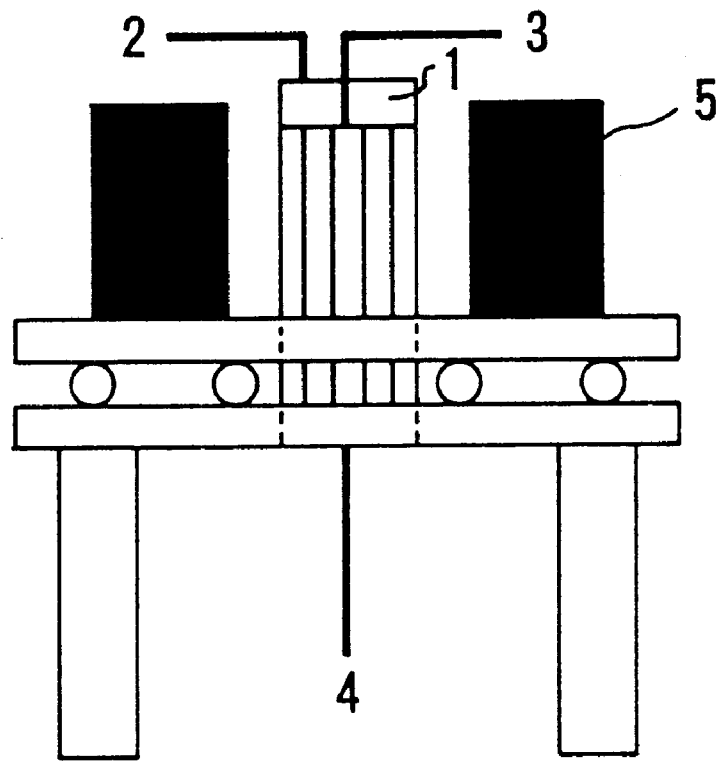

FIG. 10 shows a plane view and a cross sectional view illustrating a horizontally moving type magnet utilizing wastewater treatment apparatus. There are shown a treatment tank 1 and a line 2 for guiding generated gas to a gas retainer. When 3 or 4 is used an inflow entrance or an outflow exit, the treatment tank can be set as an upflow type or a downflow type. Permanent magnets 5 on both sides of the treatment tank are fixed on one identical plate and the density of the magnetic fluxes generated in the treatment tank is changed periodically by moving them leftward and rightward. A magnetic microorganism inclusive fixed carrier is filled in the treatment tank and the carrier is moved by utilizing the change of the magnetic flux density. Further, the carrier is retained in the tank to prevent outflow by utilizing the magnetic field in the treatment tank and keep the bacterial concentration high in the tank. Further, the state of moving the carrier can be changed by changing the speed of the lateral movement and the amplitude of the lateral movement of the magnets.

Figure 11:
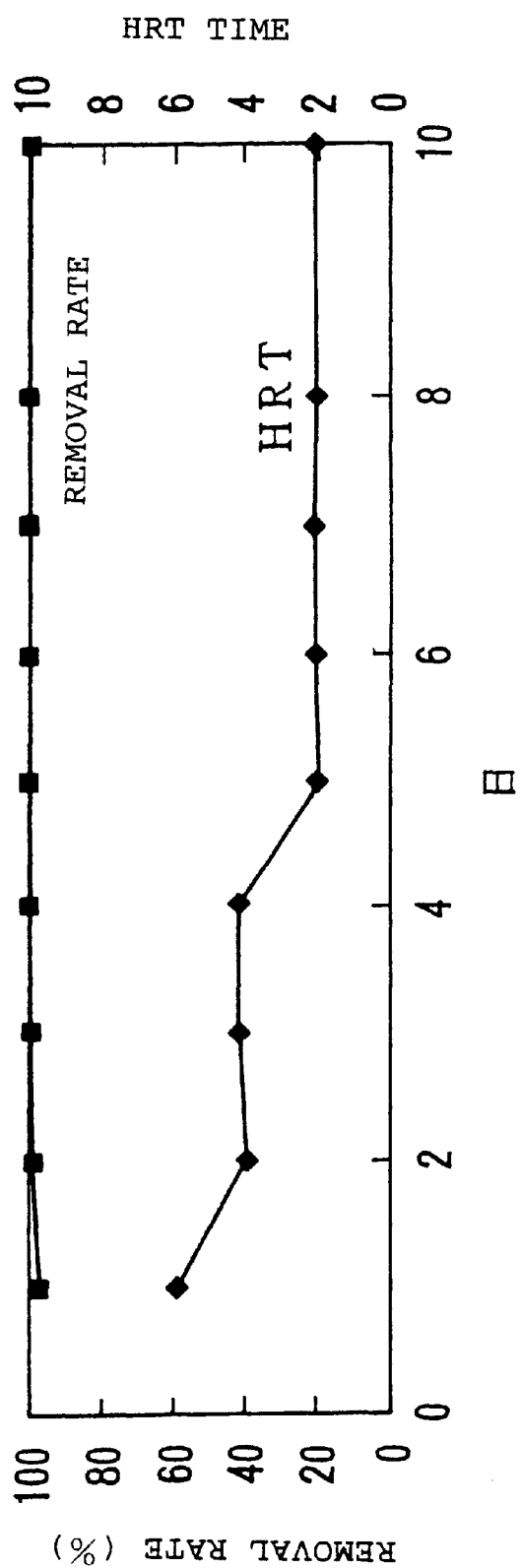
FIG. 11 shows a graph showing the example of a result for removing nitrate nitrogen by the apparatus shown in FIG. 10.

For example, nitrification treatment is conducted actually by using the horizontally moving type magnet utilizing wastewater treatment apparatus shown in FIG. 10. About 17 to 25% for an effective volume of magnetic sludge (prepared in accordance with Example 3) was incorporated in a treatment tank. The concentration of nitrate nitrogen in the inflow liquid was set to 100 mg/l. While maintaining the distance from the end of the magnet to the treatment tank at 3 mm, and the stroke of the horizontal movement of the magnet at 25 mm, it was moved at a stroking speed of 6.67 cycles/min for 15 min per 1 hour. The treatment was conducted by a continuous operation which was started with average hydraulic mean staying time (HRT) of 6 hr and lowered to 2 hr. As shown in FIG. 11, a nitrogen removal rate of about 100% was attained after the third day of operation.

Example 8
<Preparation Magnetic Cord>

15 g of polyvinyl alcohol and 1 g of sodium alginate are completely dissolved in distilled water so as to make an entire volume to 100 ml. 7.5 g of magnetite and 75 g of concentrated microorganism community (for example, activated sludge or anaerobic digested sludge) (total solid content: about 5 to 6%) are added and stirred thoroughly therein (Solution A).

It is twined around cord-supports (for example, yarns or guts derived from natural or synthetic fibers). The twined amount is controlled by providing the solution A with an appropriate viscosity. The cords in this state are dipped in a calcium chloride solution (4% (w/v), solution B). Depending on the specific gravity of the support, cords float on the surface of the solution B making the subsequent operation difficult. In order to prevent this, a magnetic field is applied from beneath the container filled with the solution B and cords are compulsorily dipped in the solution B and retained therein. Alginic acid ions in the solution A and calcium ions in the solution B are bonded to form insoluble calcium alginate on the surface of the cords. An appropriate strength can be obtained on the cord surface by dipping in the solution B for about 20 min. The cords are taken out and thoroughly washed with tap water.

The magnetic cords are frozen at about −20° C. for 24 hours. Subsequently, they are thawed and water on the surface is wiped off thoroughly. The operation of freezing/thawing is repeated for about three times. This releases molecules of water in the PVA polymer and makes the polymeric bonds firm to form magnetic cords having physical strength endurable to the wastewater treatment process.

Example 9

Figure 12:
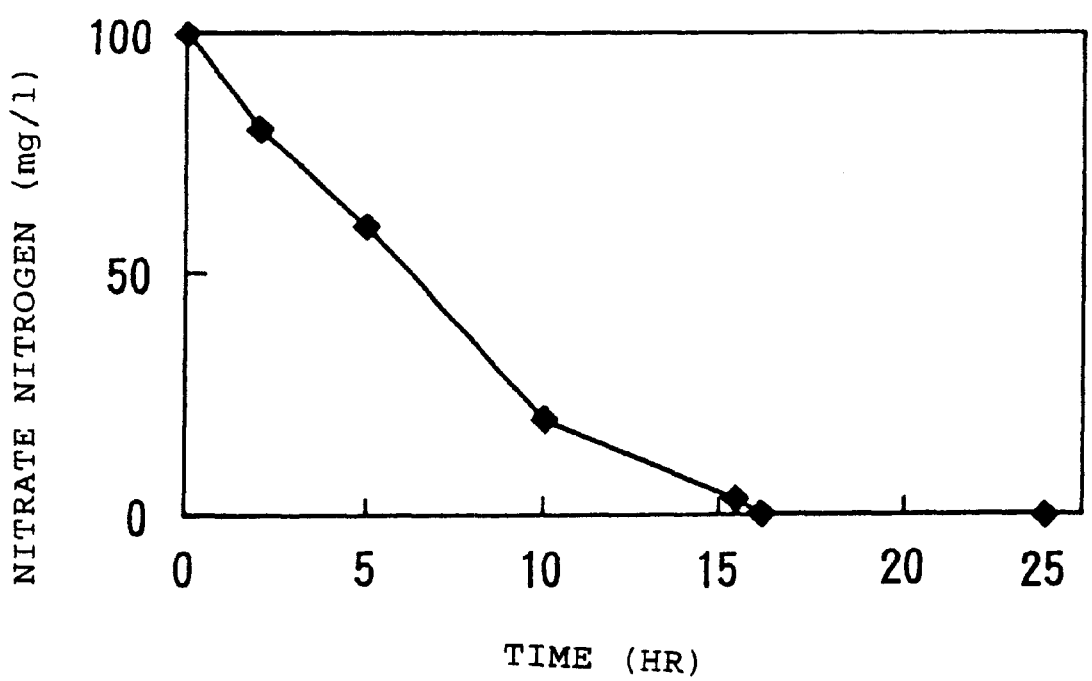
FIG. 12 shows a graph illustrating an example of a result for removing nitrate nitrogen using magnetic cords.

20 g of the magnetic cords according to Example 3, 60 ml of synthesized wastewater containing nitrate nitrogen (100 mg/l) and 3 mg/l of methanol as a hydrogen donator were added to a 200 ml Erlenmeyer flask and culturation was conducted batchwise by using a water shaker (30° C., shaking speed: 70 cycles/min). As a result, nitrate nitrogen was completely removed after about 16 hours as shown in FIG. 12.

Example 10

Figure 13:
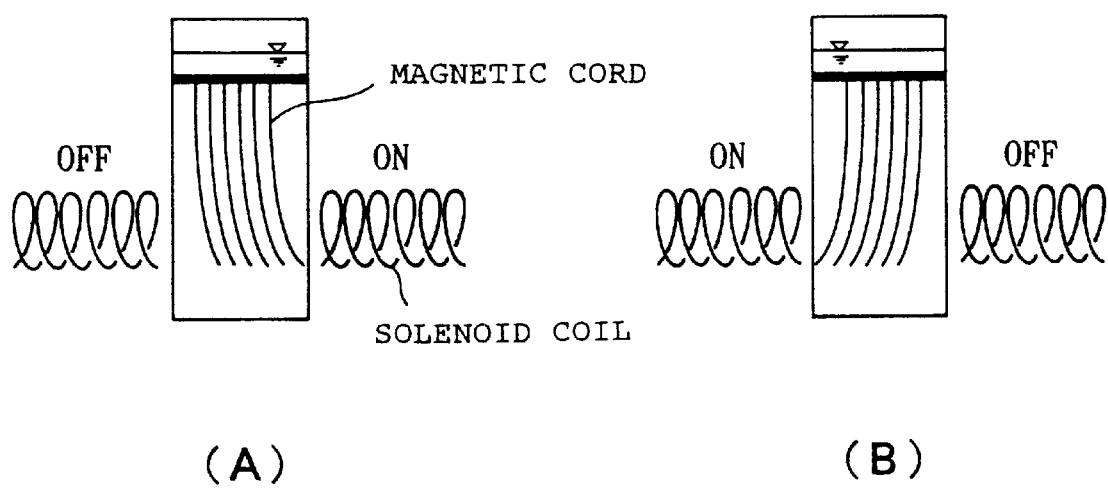
FIG. 13 shows a cross sectional view showing an example for the change of the position of magnetic cords.

When a magnetic field is generated on the right of the reactor, magnetic cords are deflected rightward as shown in FIG. 13(A). They are deflected leftward in the case of FIG. 13(B). When the operation is repeated periodically, sludge deposited excessively to the magnetic cords is separated. Thus, the control for the sludge which was relied so far on the operators' intuition and the experience can be controlled by adjusting the current supplied to the solenoid coils at the outside of the reactor.

Example 11

Figure 14:
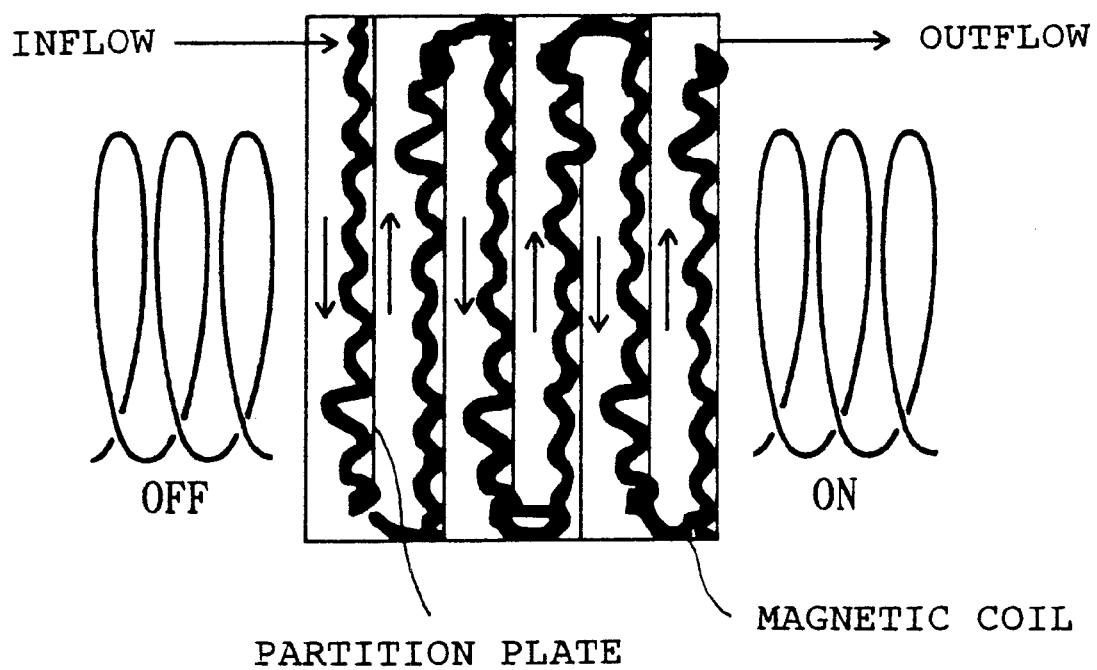
FIG. 14 shows a cross sectional view showing another example of FIG. 13.

A plurality of partition plates are disposed in a reactor shown in FIG. 14. When a magnetic field is generated on the right of the reactor as in the case of FIG. 14, the magnetic cords are retained magnetically on the surface of the partition plates. When the magnetic field is generated on the left, they are retained on the opposite surface. It is controlled by repeating the operation so as not to deposit excess sludges. The wastewater is consumed by the microorganism communities growing on the magnetic cords during passage between the partition plates.

As has been described above specifically, in accordance with the method and the apparatus for wastewater treatment of the invention of the present application that utilize the magnetic force and use the inclusive fixed carrier, it is possible to suppress floating of the carrier by eliminating generated gases depositing to the carrier, prevent channeling occurring in the carrier phase and promote penetration and diffusion of the substrate and oxygen into the carrier by the formation of a turbulence in the treatment tank.

Further, in this invention of using the magnetic cords as the inclusive fixed carrier, the following effects can also be obtained specifically <1> Since concentrated microorganism communities are possessed in the inclusive fixed gel, setting-up speed to the wastewater treatment operation is rapid.

<2> Since concentrated microorganism communities are protected in the inclusive fixed gel, it can be expected for the treatment which is resistant to external stress and stable.

<3> The reactor has no requirement for installing pipelines for maintenance and minimum required facility may suffice for the stirring facility.

<4> Maintenance can be conducted by controlling the electric current supplied to the magnetic coil outside of the reactor. No special operators' intuition or experience is required for properly maintaining the sludge.

What is claimed is:

1. A method for wastewater treatment using a magnetic sludge containing microorganisms together with a paramagnetic material using a support of insolubilized chitosan or polyvinyl alcohol as a polymer and having reactivity to a magnetic field, wherein movement of the magnetic sludge is controlled by a magnetic force, and wherein denitrification and methane fermentation are conducted simultaneously in one tank.

2. A method for wastewater treatment as defined in claim 1, wherein the magnetic sludge is retained in porous concrete.

3. A method for wastewater treatment as defined in claim 2, wherein the control by the magnetic force is conducted by a permanent magnet or a solenoid coil.

4. A method for wastewater treatment as defined in claim 2, wherein the magnetic force is provided by a fixed or variable magnetic field.

5. A method for wastewater treatment as defined in claim 1, wherein the control by the magnetic force is conducted by a permanent magnet or a solenoid coil.

6. A method for wastewater treatment as defined in claim 5, wherein the magnetic force is provided by a fixed or variable magnetic field.

7. A method for wastewater treatment as defined in claim 1, wherein the magnetic force is provided by a fixed or variable magnetic field.

* * * * *